United States Patent
Taipale et al.

(10) Patent No.: US 7,825,609 B2
(45) Date of Patent: *Nov. 2, 2010

(54) ELECTRONIC BALLAST HAVING A FLYBACK CAT-EAR POWER SUPPLY

(75) Inventors: Mark S. Taipale, Harleysville, PA (US); Venkatesh Chitta, Center Valley, PA (US); Dragan Veskovic, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 123 days.

This patent is subject to a terminal disclaimer.

(21) Appl. No.: 12/168,977

(22) Filed: Jul. 8, 2008

(65) Prior Publication Data

US 2008/0315779 A1    Dec. 25, 2008

Related U.S. Application Data

(63) Continuation of application No. 11/483,374, filed on Jul. 7, 2006, and a continuation of application No. 11/120,230, filed on May 2, 2005, now Pat. No. 7,432,661.

(51) Int. Cl.
    *G05F 1/00* (2006.01)
(52) U.S. Cl. ..................................... 315/291
(58) Field of Classification Search ................. 315/291, 315/224, 200 R, 209 R, DIG. 7
    See application file for complete search history.

(56) References Cited

U.S. PATENT DOCUMENTS 5,986,901 A    11/1999    Weng (Continued)

FOREIGN PATENT DOCUMENTS

JP    6-6979    1/1994

OTHER PUBLICATIONS

Youk-Sik Youn et al., "A Unity Power Factor Electronic Ballast for Fluorescent Lamp having Improved Valley Fill and Valley Boost Converter", Power Electronics Specialists Conference, 1997, PESC '97, Record., 28th Annual IEEE, St. Louis, Mo, USA, Jun. 22-27, 1997, New York, NY, USA, IEEE, US, vol. 1, Jun. 22, 1997, pp. 53-59.

(Continued)

*Primary Examiner*—Douglas W Owens
*Assistant Examiner*—Minh D A
(74) *Attorney, Agent, or Firm*—Mark E. Rose; Philip N. Smith

(57) ABSTRACT

An electronic ballast for driving a gas discharge lamp includes a rectifier to convert an AC mains input voltage to a rectified voltage, a filter circuit for producing a DC bus voltage, an inverter for converting the bus voltage to a high-frequency AC voltage for driving the lamp, an output circuit for supplying an essentially sinusoidal voltage to the lamp, a control circuit for controlling the inverter, and a flyback cat-ear power supply for powering the control circuit. The power supply supplies current to the inverter when the rectified voltage is less than a predetermined level, and draws current only when the inverter is not drawing current directly from the AC mains, so as to make the input current to the ballast substantially sinusoidal. The ballast thus has substantially improved power factor and THD, and operates more efficiently.

17 Claims, 7 Drawing Sheets

U.S. PATENT DOCUMENTS

| | | |
|---|---|---|
| 6,061,259 A | 5/2000 | DeMichele |
| 6,111,368 A | 8/2000 | Luchaco |
| 6,259,614 B1 | 7/2001 | Ribarich et al. |
| 6,275,397 B1 | 8/2001 | McClain |
| 6,452,344 B1 | 9/2002 | MacAdam et al. |
| 6,486,616 B1 * | 11/2002 | Liu et al. ............... 315/291 |
| 6,639,369 B2 | 10/2003 | Ribarich |
| 6,674,248 B2 | 1/2004 | Newman, Jr. et al. |
| 6,784,622 B2 | 8/2004 | Newman, Jr. et al. |
| 6,791,279 B1 | 9/2004 | Shearer et al. |
| 6,956,336 B2 | 10/2005 | Ribarich |
| 7,061,189 B2 | 6/2006 | Newman, Jr. et al. |
| 7,068,016 B2 | 6/2006 | Athari |
| 7,088,081 B2 | 8/2006 | Takahashi et al. |
| 7,148,664 B2 | 12/2006 | Takahashi et al. |
| 7,285,919 B2 | 10/2007 | Newman, Jr. et al. |
| 7,312,582 B2 | 12/2007 | Newman, Jr. et al. |
| 7,432,661 B2 * | 10/2008 | Taipale et al. ........... 315/209 R |
| 2003/0001516 A1 | 1/2003 | Newman, Jr. et al. |
| 2004/0183477 A1 | 9/2004 | Newman, Jr. et al. |
| 2006/0175983 A1 | 8/2006 | Crouse et al. |

OTHER PUBLICATIONS

USPTO, International Search Report and Written Opinion for PCT/US06/16113, Sep. 19, 2006, 12 pages.

* cited by examiner

ELECTRONIC BALLAST HAVING A FLYBACK CAT-EAR POWER SUPPLY

CROSS-REFERENCE TO RELATED APPLICATIONS

This application is a continuation of commonly-assigned U.S. patent application Ser. No. 11/483,374, filed Jul. 7, 2006 now U.S. Pat. No. 7,432,661, entitled ELECTRONIC BALLAST HAVING A FLYBACK CAT-EAR POWER SUPPLY, the entire disclosure of which is hereby incorporated by reference.

BACKGROUND OF THE INVENTION

1. Field of the Invention

The present invention relates to electronic ballasts and, more particularly, to electronic dimming ballasts for gas discharge lamps, such as fluorescent lamps.

2. Description of the Related Art

Electronic ballasts for fluorescent lamps typically include a "front end" and a "back end". The front end typically includes a rectifier for changing alternating-current (AC) mains line voltage to a direct-current (DC) bus voltage and a filter circuit for filtering the DC bus voltage. The ballast back end typically includes a switching inverter for converting the DC bus voltage to a high-frequency AC voltage, and a resonant tank circuit having a relatively high output impedance for coupling the high-frequency AC voltage to the lamp electrodes.

The front end of electronic ballasts also often include a boost converter, which is an active circuit for boosting the magnitude of the DC bus voltage above peak of line voltage, and for improving the total harmonic distortion (THD) and power factor of the input current to the ballast. However, boost converters typically include integrated circuits (IC) and semiconductor switches, such as field effect transistors (FETs). In order to handle the amount of current required to drive the lamp at high end (i.e. at or near 100% light intensity), the components of such a boost converter are typically large and costly.

A prior art ballast 100 will be described with reference to the block diagram shown in FIG. 1 and the voltage and current waveforms shown in FIGS. 2a-2d and is explained in greater detail in U.S. Pat. No. 6,674,248, issued on Jan. 6, 2004, entitled "Electronic Ballast", which is herein incorporated by reference in its entirety.

The ballast 100 includes an electromagnetic interference (EMI) filter 115 and a rectifier 120 both capable of being connected to an AC power supply such as a typical 120V, 60 Hz AC main. The EMI filter 115 isolates high-frequency noise generated by the ballast circuitry from the AC power supply. The rectifier 120 converts the AC input voltage to a rectified pulsating DC voltage 210, which has a maximum value of $V_{PEAK}$ (shown as 230 in FIG. 2a). For example, if the AC input voltage has an RMS (root mean square) value of 277V, the value of $V_{PEAK}$ will be approximately 392V. The rectifier 120 is connected to a valley-fill circuit 130 through a diode 140. A high-frequency filter capacitor 150 is connected across the inputs to the valley-fill circuit 130. The valley-fill circuit 130 selectively charges and discharges an energy-storage device, such as one or more capacitors, so as to fill the "valleys" between successive rectified voltage peaks to produce a substantially DC bus voltage 220. The DC bus voltage is the greater of either the rectified voltage, or the voltage across the energy storage device in the valley-fill circuit 130.

The outputs of the valley-fill circuit 130 are in turn connected to the inputs to an inverter 160. The inverter 160 converts the rectified DC voltage to a high-frequency AC voltage. The outputs of the inverter 160 are connected to an output circuit 170, which typically includes a resonant tank, and may also include a coupling transformer. The output circuit filters the inverter 160 output to supply essentially sinusoidal voltage, as well as provide voltage gain and increased output impedance. The output circuit 170 is capable of being connected to drive a load 180 such as a gas discharge lamp; for example, a fluorescent lamp.

An output current sense circuit 185 coupled to the load 180 provides load current feedback to a control circuit 190. The control circuit 190 generates control signals to control the operation of the valley-fill circuit 130 and the inverter 160 so as to provide a desired load current to the load 180. A power supply 110 is connected across the outputs of the rectifier 120 to provide the necessary power for proper operation of the control circuit 190.

A schematic representation of a prior art valley-fill circuit 330 that may be used with ballast 100 is shown in FIG. 3a. The rectified pulsating DC voltage 210 (in FIG. 2a) is provided to the valley-fill circuit 330 through diode 140. Two energy-storage capacitors 280, 282 are provided in the valley-fill circuit 330. These energy-storage capacitors 280, 282 charge in series with a charging current flowing through capacitor 280, diode 284, capacitor 282, and a resistor 286, which limits the magnitude of the charging current. The energy-storage capacitors 280, 282 are sized such that the same voltage, the valley-fill voltage $V_{VF}$ (shown as 235 in FIG. 2a), is produced across each capacitor. The magnitude of the valley-fill voltage $V_{VF}$ is approximately one-half of the peak, $V_{PEAK}$, of the rectified pulsating DC voltage 210, which is about 200V when $V_{PEAK}$ is 392V. However, the energy-storage capacitors 280, 282 discharge in parallel, with current flowing through diode 288 to allow capacitor 280 to discharge, and through diodes 290 and 292 to allow capacitor 282 to discharge. Thus, a DC bus voltage 220 is formed across the valley-fill circuit 330 as shown in FIG. 2b.

When the rectified voltage 210 is greater than the valley-fill voltage $V_{VF}$, i.e. one-half of the peak of the AC mains line voltage, the inverter 160 draws current directly from the AC power supply, through the EMI filter 115 and the rectifier 120, to drive the lamp. When the rectified voltage 210 is less than the valley-fill voltage $V_{VF}$, then the inverter 160 draws current from the energy-storage capacitors in parallel. This results in the ballast drawing an input current 240 from the AC mains only during a relatively large duration of each line half-cycle centered about the peak of the line voltage, which allows for unwanted harmonics and undesirable total harmonic distortion (THD).

In order to lower the THD, the input current of the ballast should be as sinusoidal as possible (as shown by 250 in FIG. 2c). One approach to making the input current more sinusoidal is to implement power supply 110 as a cat-ear power supply, which ideally draws an input current 260 (shown in FIG. 2d) near the zero crossing of the AC mains input voltage waveform at either the leading edge of each half-cycle, or the trailing edge of each half-cycle, or both. When the current drawn by the cat-ear power supply is added to the inverter current 240, the input current waveform is shaped to be more nearly sinusoidal, such that the input current THD is substantially reduced, and the power factor of the ballast is increased. The cat-ear power supply derives its name from the shape of its input current waveform that "fills in" the current waveform drawn by the ballast from the AC mains around the zero crossings (the shape resembling the ears of a cat). That is, the input current waveform typically rises from zero sinusoidally to a value substantially below peak, then falls sharply to zero, or rises from zero sharply to a value substantially below peak, then falls sinusoidally to zero. The cat-ear power supply typically "steals" power from the line when the back end is not drawing current directly from the line. The cat-ear power supply may be provided with circuitry that "cuts in" and "cuts out" the power supply in response to fixed input voltage levels. Along with helping to reduce THD and improve power factor, the cat-ear power supply also supplies the power necessary to operate the control circuit 190.

A prior art cat-ear power supply 310 is shown in FIG. 3b. The cat-ear power supply 310 is designed with fixed voltage cut-in and cut-out points and will only draw current from the AC mains when the rectified voltage 210 is below a predetermined value. This condition will occur from a predetermined time before a line voltage zero crossing to a predetermined time after the line voltage zero crossing. The cut-out and cut-in voltage points can be adjusted so that the cat-ear power supply 310 draws current during a first interval from a time just after the line voltage zero crossing to a time when the energy storage capacitor in the valley-fill circuit 130 begins drawing charging current from the line, and during a second interval from a time when the valley-fill energy storage capacitor stops drawing charging current from the line until the next line voltage zero crossing.

When the rectified voltage 210 is lower than a predetermined voltage, a charging field effect transistor (FET) 312 conducts to allow charging of energy-storage capacitor 314, which charges toward a voltage $V_{CC}$. Alternatively, when the rectified line voltage is equal to or greater than the predetermined voltage, then cut-out transistor 318 begins conducting. The collector of the cut-out transistor 318 pulls the cathode of a Zener diode 320 toward $V_{CC}$, which effectively turns off the charging FET 312. The predetermined cut-in and cut-out voltages are determined by the resistive voltage divider network including resistors 322 and 324, to which the base of the cut-out transistor 318 is connected.

The rate of charge of the capacitor 314 is determined by a resistor 316 in series with the drain of the MOSFET transistor 312. To allow for a substantially piece-wise continuous ballast input current, the value of the current drawn by cat-ear power supply 310 should be substantially the same as the current that will be drawn by the back end of the ballast 100 at the predetermined cut-out and cut-in times. In conjunction with the value of the capacitor 314, resistor 316 can be chosen so that the current drawn will have a desired maximum current that is substantially the same as the current that will be drawn by the back end at the predetermined cut-out and cut-in times and such that the current drawn will substantially match the shape of the AC mains voltage.

However, the current drawn from $V_{CC}$ by the control circuit 190 of ballast 100 is not constant throughout the operation of the ballast. Consequently, the current required to charge capacitor 314 is sometimes smaller, thus the time required to charge capacitor 314 is shorter. Therefore, the current drawn by cat-ear supply 310 sometimes does not reach the desired maximum current at the predetermined cut-out and cut-in times as shown by 360 in FIG. 3c. When the cat-ear supply input current 360 is added to the current 240 drawn by the back end, the resulting ballast input current 370 (shown in FIG. 3d) is not completely sinusoidal, thus contributing to the THD of the ballast.

Additionally, in order to obtain the appropriate shape of the input current waveform, the power dissipated by the resistor may be very large. For example, the power into the cat-ear power supply with the input current 260 (in FIG. 2d) may be approximately four watts each half-cycle. If the maximum power consumption of the control circuit 190 is approximately 0.5 watts, then 3.5 watts must be dissipated in the resistor 316 during each half-cycle. This means that the resistor 316 must be physically large in order to handle the required power dissipation.

Thus, there exists a need for a cat-ear power supply for an electronic ballast that is more efficient and draws the appropriate amount of current when the back end is not drawing current directly from the line in order to reduce the THD of the ballast. Further, there exists a need for an electronic dimming ballast that has the reduced THD of a ballast having an active boost converter, but does not require the large, expensive components of such boost converters.

SUMMARY OF THE INVENTION

According to an embodiment of the present invention, an electronic ballast, which draws an input current from an AC power supply and drives a gas discharge lamp, comprises: (1) a rectifier for rectifying an AC input voltage from said AC power supply to produce a rectified voltage; (2) a filter circuit for converting said rectified voltage to a filtered bus voltage; (3) an inverter for converting said bus voltage to a high-frequency AC drive voltage to drive said lamp; (4) a control circuit coupled to the inverter for controlling the operation of said inverter; and (5) a ballast power supply that receives said rectified voltage and generates a substantially DC voltage for powering said control circuit. The ballast power supply selectively draws current from said AC power supply when said rectified voltage is lower than a predetermined value such that said input current to said ballast is essentially sinusoidal. The ballast power supply is coupled to said inverter and is operable to provide current to said inverter when the magnitude of said rectified voltage is less than said predetermined level.

According to another embodiment of the present invention, an electronic ballast for driving a gas discharge lamp comprises a rectifier, an inverter, a first circuit coupled from the rectifier to the inverter, and a second coupled from the rectifier to the inverter in parallel electrical connection with the first circuit. The rectifier rectifies the AC input voltage from said AC power supply to produce a rectified voltage, while the inverter generates a high-frequency AC drive voltage to drive said lamp. The first circuit supplies current from said AC power supply to said inverter and provides said rectified voltage to said inverter when the magnitude of said rectified voltage is greater than a predetermined value. The second circuit supplies current to said inverter and provides a boosted voltage to said inverter when the magnitude of said rectified voltage is less than said predetermined value. The magnitude of said boosted voltage is greater than the magnitude of said rectified voltage when the magnitude of said rectified voltage is less than said predetermined value.

According to another aspect of the present invention, an electronic ballast for driving a gas discharge lamp comprises a rectifier for rectifying an AC line voltage to produce a rectified voltage, and a boost converter for receiving said rectified voltage and producing a substantially DC output voltage having an average magnitude less than a peak value of said rectified voltage.

A cat-ear circuit for an electronic ballast having a front end for receiving an AC input voltage and a back end for driving a gas discharge lamp is also described herein. The cat-ear circuit comprises an input for receipt of a rectified voltage, a semiconductor switch, a transformer, a control circuit, and first and second outputs. The semiconductor switch is coupled in series electrical connection between said input and a circuit common and has a conductive state and a non-conductive state. The transformer has a primary winding and a secondary winding, where said primary winding coupled in series electrical connection with said semiconductor switch. The control circuit is operable to receive said rectified voltage and to repeatedly switch said semiconductor switch at a high frequency between said conductive state and said non-conductive state only when said rectified voltage is below a predetermined level, such that a boosted voltage is produced across said secondary winding of said transformer. The first output for provides said boosted voltage to said ballast back end only when said rectified voltage is below said predetermined level, and the second output provides a substantially low-magnitude DC voltage.

DETAILED DESCRIPTION OF THE INVENTION

Figure 1:
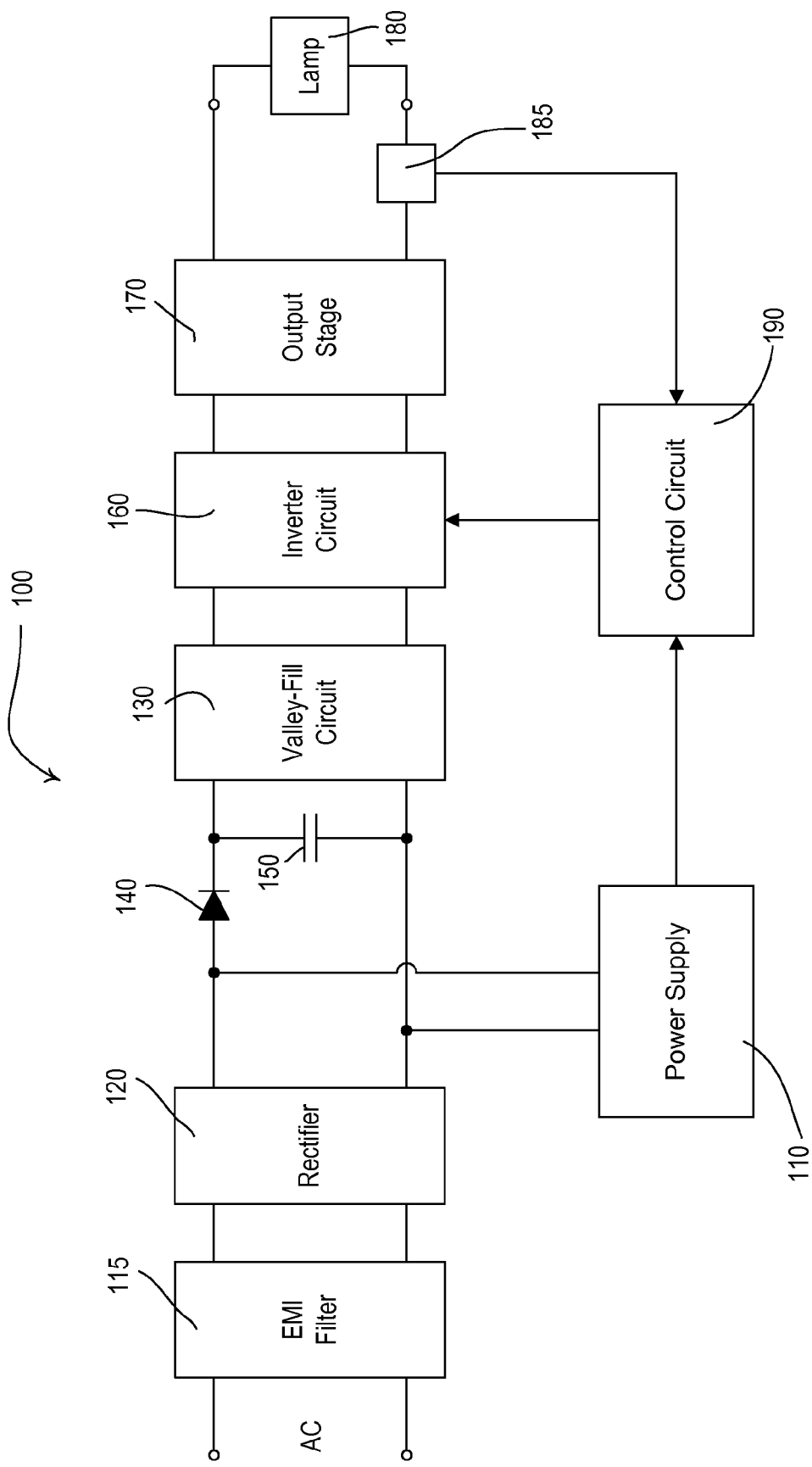
FIG. 1 is a simplified block diagram of a prior art electronic ballast.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 4:
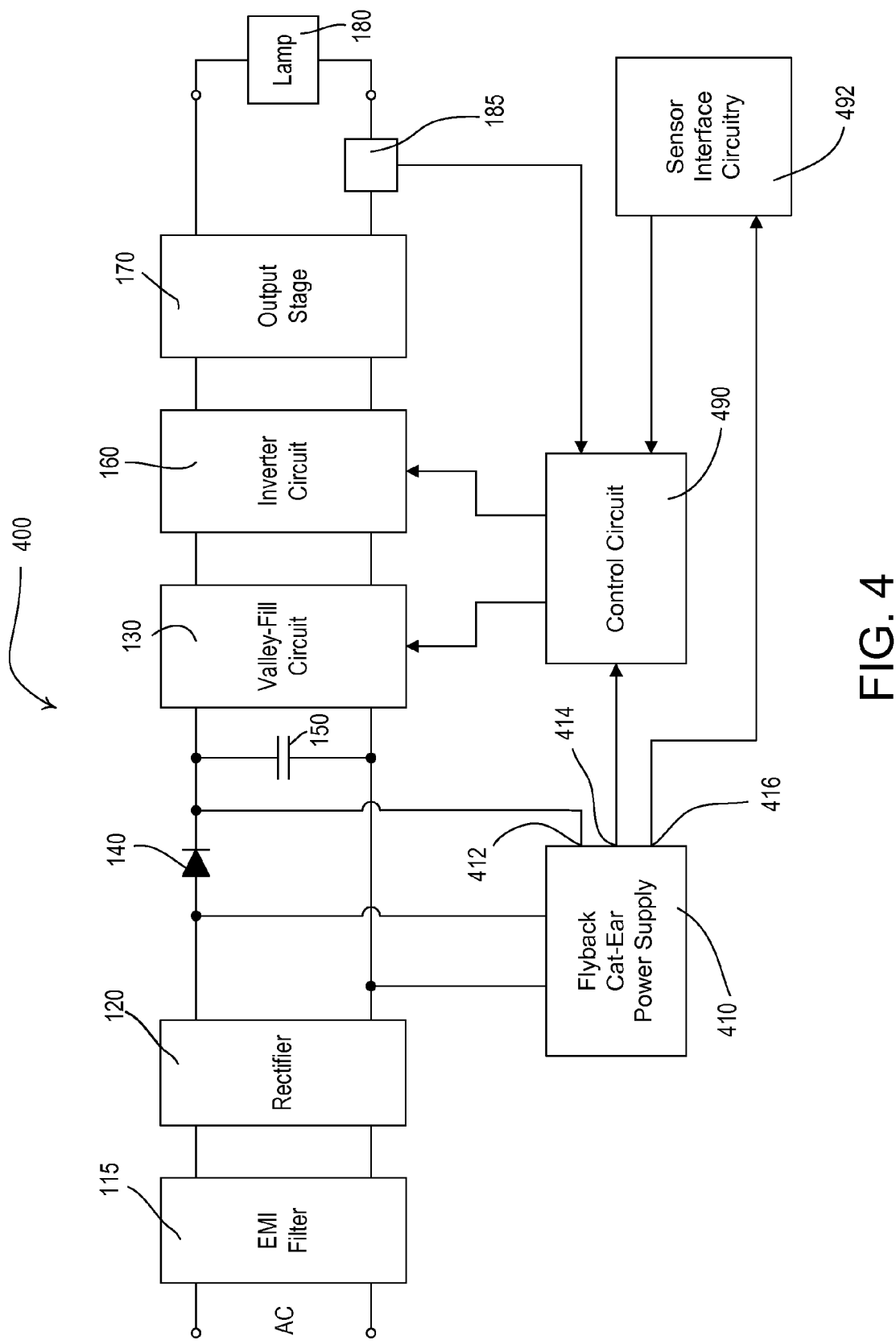
FIG. 4 is a simplified block diagram of the electronic ballast of the present invention.

Referring to FIG. 4, there is shown a simplified schematic diagram of an electronic ballast 400 constructed in accordance with the invention. A flyback cat-ear power supply 410 is coupled to the output of the rectifier 120. A flyback converter can be defined as a buck-boost switch-mode power supply topology in which, during the first period of a switching cycle, the energy is stored in an inductance, and during the second period, this energy is transferred to a different winding of the same inductor and into the load. Flyback converters are well known in the art and are defined further in "Principles of Power Electronics" by John G. Kassakian et al., Addison-Wesley Publishing Company, 1991, chapter 7, pp. 139-165, which is herein incorporated by reference in its entirety. The flyback cat-ear power supply 410 includes a first output 412 coupled to the input of the valley-fill circuit 130, a second output 414 providing a 15 VDC supply voltage for powering a control circuit 490, and a third output 416 providing an isolated 15 $V_{DC}$ supply voltage. Ballast 400 further comprises a sensor interface circuit 492 that receives the isolated 15 $V_{DC}$ supply from the flyback cat-ear power supply 410 and provides the supply to a device external to the ballast (not shown), such as an occupancy sensor or a photosensor. The sensor interface circuit 492 also receives control signals from the external devices and relays these control signals to the control circuit 490.

Figure 5:
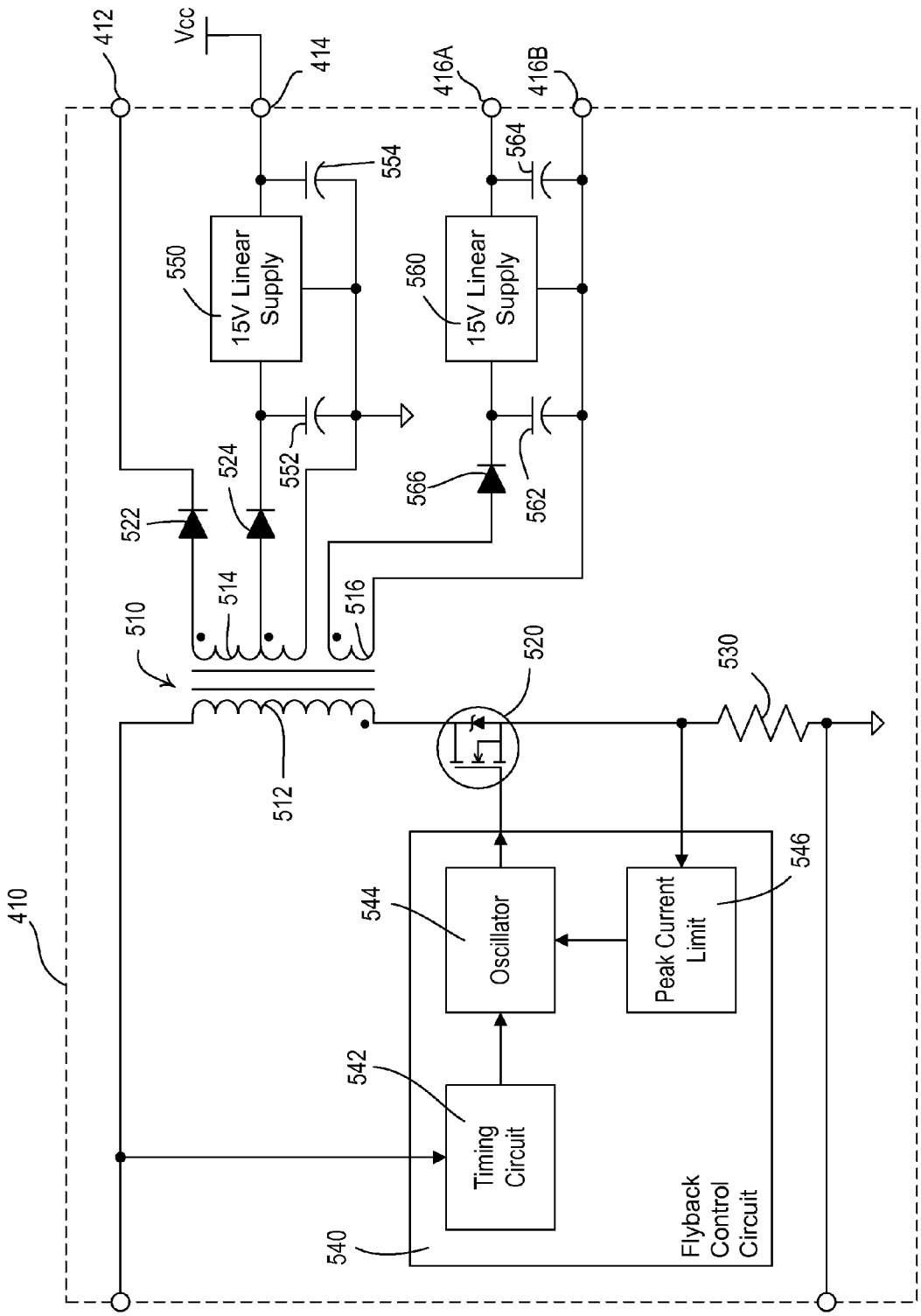
FIG. 5 is a simplified schematic of the flyback cat-ear power supply of the present invention.

The flyback cat-ear power supply 410 of the current invention is shown in greater detail in FIG. 5. The rectified voltage at the output of the rectifier 120 is provided to one side of the primary winding 512 of a flyback transformer 510. A FET 520 is provided in series with the primary winding 512 of the flyback transformer 510 and a current sense resistor 530. The transformer 510 also includes a secondary winding 514 that is coupled to two diodes 522, 524. Note that current does not flow simultaneously in the primary and secondary windings of a flyback transformer.

A flyback control circuit 540, comprising a timing circuit 542, an oscillator 544, and a peak current limit circuit 546, controls the conduction state of the FET 520. Oscillator 544 produces a square wave having a constant frequency and a constant duty cycle for driving the FET 520. Preferably, the frequency and duty cycle of the square wave produced by the oscillator 544 are 140 kHz and 50%, respectively. The duty cycle is selected to provide the minimal THD for the ballast 400. The square wave is provided to a control input of FET 520.

The timing circuit 542 determines when the flyback cat-ear power supply 410 should be drawing current from the AC mains and controls the oscillator 544 accordingly. Since the flyback cat-ear power supply 410 should draw current when the output of the rectifier 120 is below the DC bus voltage, the timing circuit 542 detects when the voltage at the output of the rectifier 120 is below the valley-fill voltage $V_{VF}$ (i.e. approximately 200V) and drives the oscillator 544 to begin oscillating. When the output of the rectifier 120 is above the valley-fill voltage, the timing circuit 542 causes the oscillator 544 to stop oscillating.

Peak current limit circuit 546 monitors the voltage across current sense resistor 530 and thus the current through FET 520. If peak current limit circuit 546 detects an over-current condition in FET 520, i.e. when the current exceeds a limit that ensures normal operation of the FET, the peak current limit circuit causes oscillator 544 to interrupt the present oscillation cycle, thus causing the FET to stop conducting.

As oscillator 544 drives the FET 520 with the square wave, the FET switches between conductive and non-conductive states. When the FET 520 is conducting, current flows through the magnetizing inductance of the primary side 512 of transformer 510. At this time, current does not flow in the secondary winding 516 because of the orientation of diodes 522, 524. When the FET 520 is non-conducting, the energy that is stored in the magnetizing inductance is transferred to the secondary winding 516 and a voltage is produced across the secondary winding. The flyback cat-ear power supply 410 operates in a discontinuous mode, which means that all energy that is stored in the primary winding 512 is transferred to the secondary winding 514 and there is a time that the currents through the transformer reach a value of zero each cycle. The voltage produced on the secondary winding 514 is dependent on the turns ratio of transformer 510, the frequency of the current through the FET 520, and the duty cycle of the current through FET 520. Because the frequency and duty cycle of the square wave are fixed, no feedback from the secondary side 514 of transformer 510 back to flyback control circuit 540 is needed.

When the voltage at the output of the rectifier 120 is below the DC bus voltage, the oscillator 544 is actively switching the FET 520 and a voltage having a magnitude approximately equal to the valley-fill voltage $V_{VF}$ is produced across the secondary winding 514 of transformer 510. This voltage is provided through diode 522 to the first output 412, which is coupled to the input of the valley-fill circuit 130. In this way, when the voltage at the output of the rectifier 120 is not great enough to supply current to the inverter 170, the flyback cat-ear power supply is capable of supplying current to the inverter through the first output 412. Since the first output 412 is coupled to the valley-fill circuit 130, the voltage at first output 412 is limited to the DC bus voltage 220, which has an average magnitude less than a peak value of the rectified voltage, e.g., approximately one-half of the peak of the rectified voltage, when the voltage at the output of the rectifier 120 is below the DC bus voltage.

The secondary winding 514 of the transformer 510 includes a tap that is provided to the anode of the diode 524. When the FET 520 is switching, a voltage of approximately 20V is produced from the tap to circuit common. This voltage is provided to a first 15V regulated linear power supply 550, having an input energy storage capacitor 552 and an output energy storage capacitor 554. The linear power supply 550 provides a regulated DC output of 15 volts to second output 414 of the flyback cat-ear power supply 410 for powering the control circuit 490 of the ballast 400. The 15V linear power supply 550 tightly controls the regulated DC output voltage to remain within specified limits despite variations in the input voltage or the load current.

Additionally, the transformer 510 includes an auxiliary winding 516 that is provided to a second 15V regulated linear power supply 560 through a diode 566. The 15V linear power supply 560 has an input energy storage capacitor 562 and an output energy storage capacitor 564. The linear power supply 560 provides an isolated DC output of 15 volts at third output points 416A and 416B. The auxiliary winding 516 is not electrically connected to the rest of the ballast circuit and thus the isolated DC output of the 15V regulated linear power supply 560 is electrically isolated from any high voltage points in the rest of the ballast circuitry. This is desirable for safety concerns when powering external low-voltage devices, such as occupancy sensors and photosensors, from the ballast.

Figure 2A:
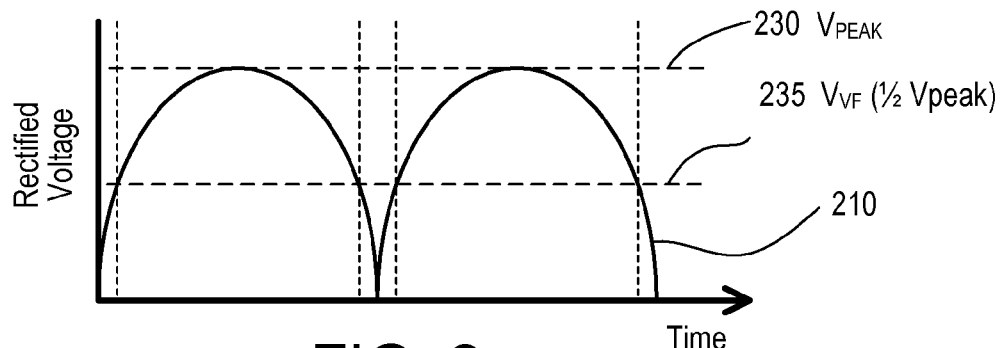
FIG. 2a is a simplified waveform diagram illustrating the rectified voltage of the ballast of FIG. 1.
Figure 2B:
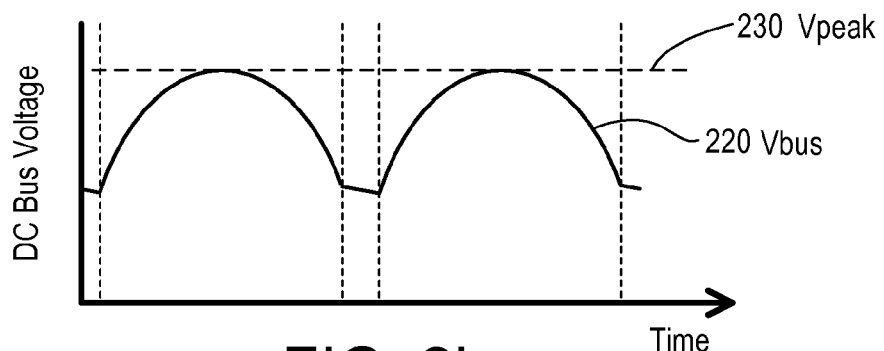
FIG. 2b is a simplified waveform diagram illustrating the DC bus voltage of the ballast of FIG. 1.
Figure 2C:
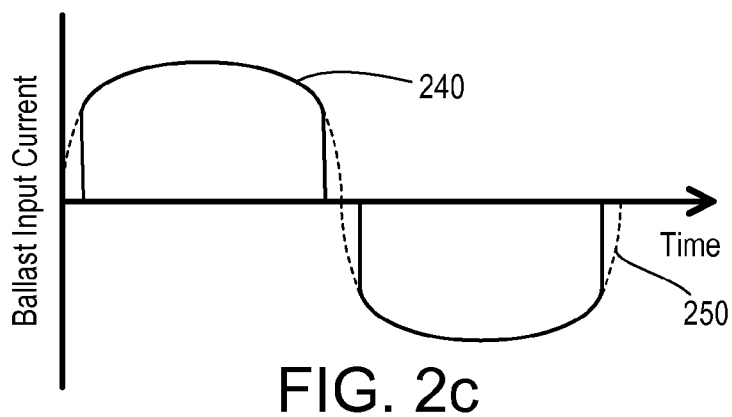
FIG. 2c is a simplified waveform diagram illustrating the input current of the ballast of FIG. 1.
Figure 2D:
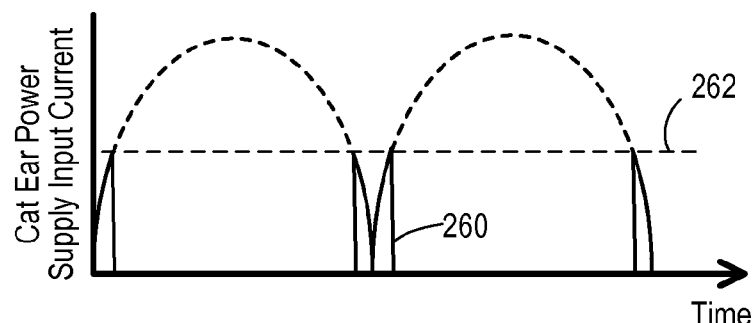
FIG. 2d is a simplified waveform diagram illustrating the ideal input current of a cat-ear power supply of the ballast of FIG. 1.

To minimize the THD of the ballast, the input current of the ballast should be as sinusoidal and continuous as possible. The input current of the ballast is the combination of the current drawn directly from the AC line by the inverter, and the input current drawn from the AC line by the power supply. The current drawn from the AC line by the inverter 160 is determinable (shown as 240 in FIG. 2C). The desired input current 260 for the flyback cat-ear power supply is one that will cause the total ballast input current 250 to be as sinusoidal as possible. The desired peak value 262 of the flyback cat-ear power supply input current 260 can therefore be determined from the ballast input current 240 due to the inverter with the ballast at high-end. Since the AC input voltage, $v_{AC}(t)$, and the shape and peak value of the desired current draw, $i_{PS}(t)$, of the flyback cat-ear power supply are known, a desired average power for the flyback cat-ear power supply, $P_{DESIRED}$, can be calculated using the equation $$P_{DESIRED} = \int v_{AC}(t) * i_{PS}(t) dt. \quad \text{(Equation 1)}$$

For example, for a ballast with an AC input voltage of 277 $V_{RMS}$, driving three T8 lamps (32 watts each), and a ballast factor of 0.85, the desired average power consumption of the power supply is 4 W in order to obtain the optimal THD of the ballast at high-end.

The flyback cat-ear power supply 410 provides outputs to the input of the inverter 160 (through the first output 412), the ballast control circuit 490 (through the second output 414), and, optionally, external sensors (through the third output 416). The average power consumption of each of the outputs of the flyback cat-ear power supply 410, plus any power that is dissipated in the power supply during the conversion process, must total up to the desired average power consumption, $P_{DESIRED}$. Since the ballast control circuit 490, and any external sensors, will not typically require enough power to total up to $P_{DESIRED}$, the power dissipated in the power supply and the power supplied to the inverter 160 must account for the rest of the desired power consumption.

Because the flyback cat-ear power supply 410 has a path through the first output 412 to supply power to the inverter 160, the excess of the desired average power consumption, $P_{DESIRED}$, does not need to be wastefully dissipated in the power supply. For example, consider the following power requirements of the ballast 400:

Power into the flyback cat-ear power supply 410 is 4 watts.
Power consumption of the ballast control circuit 490 is 0.5 watts.
Power consumption of an external occupancy sensor is 0.5 watts.
Power unavoidably lost during the conversion process is 0.5 watts.

Figure 3A:
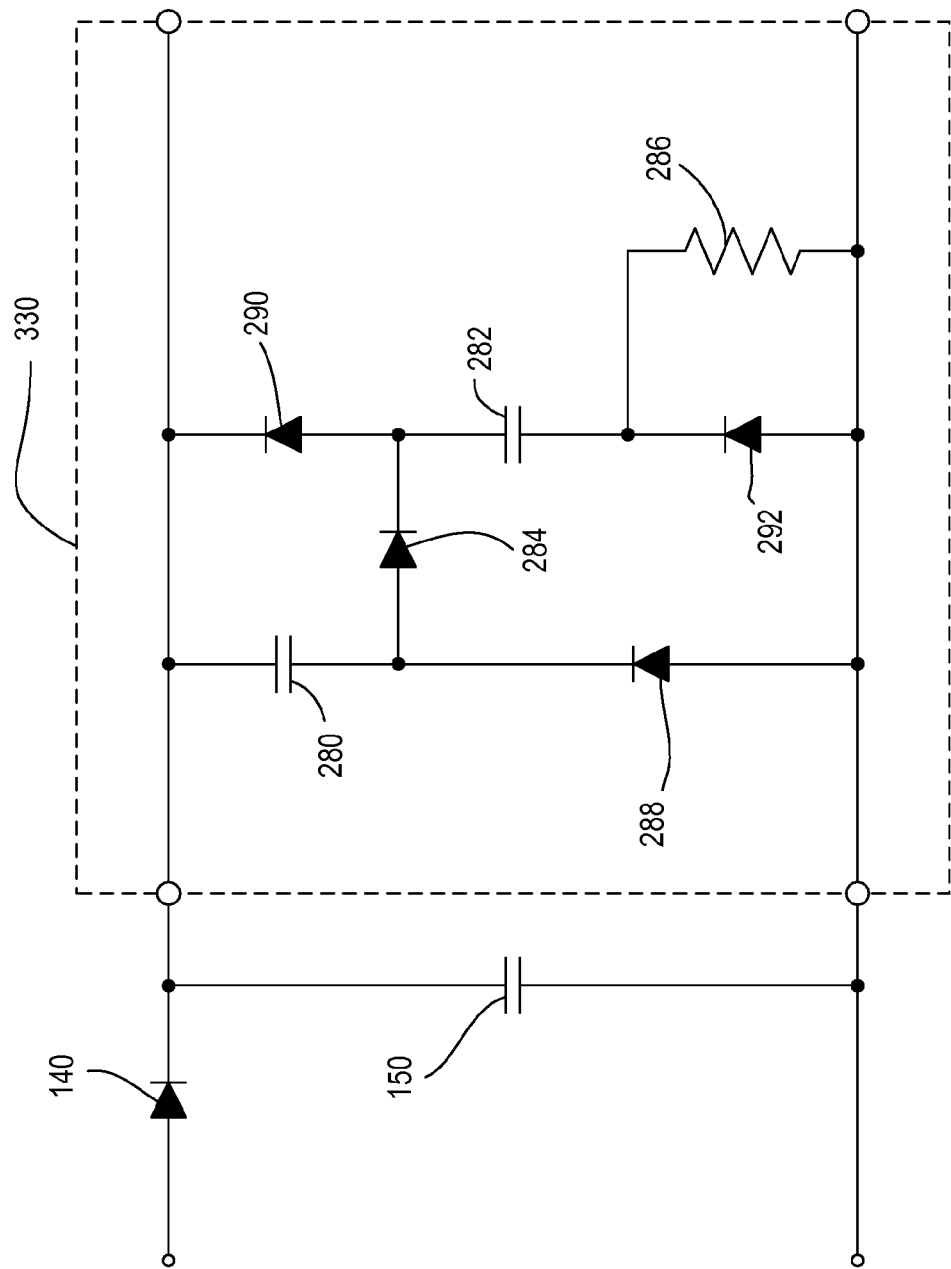
FIG. 3a is a simplified schematic of a prior art valley-fill circuit that may be used with the ballast of FIG. 1.
Figure 3B:
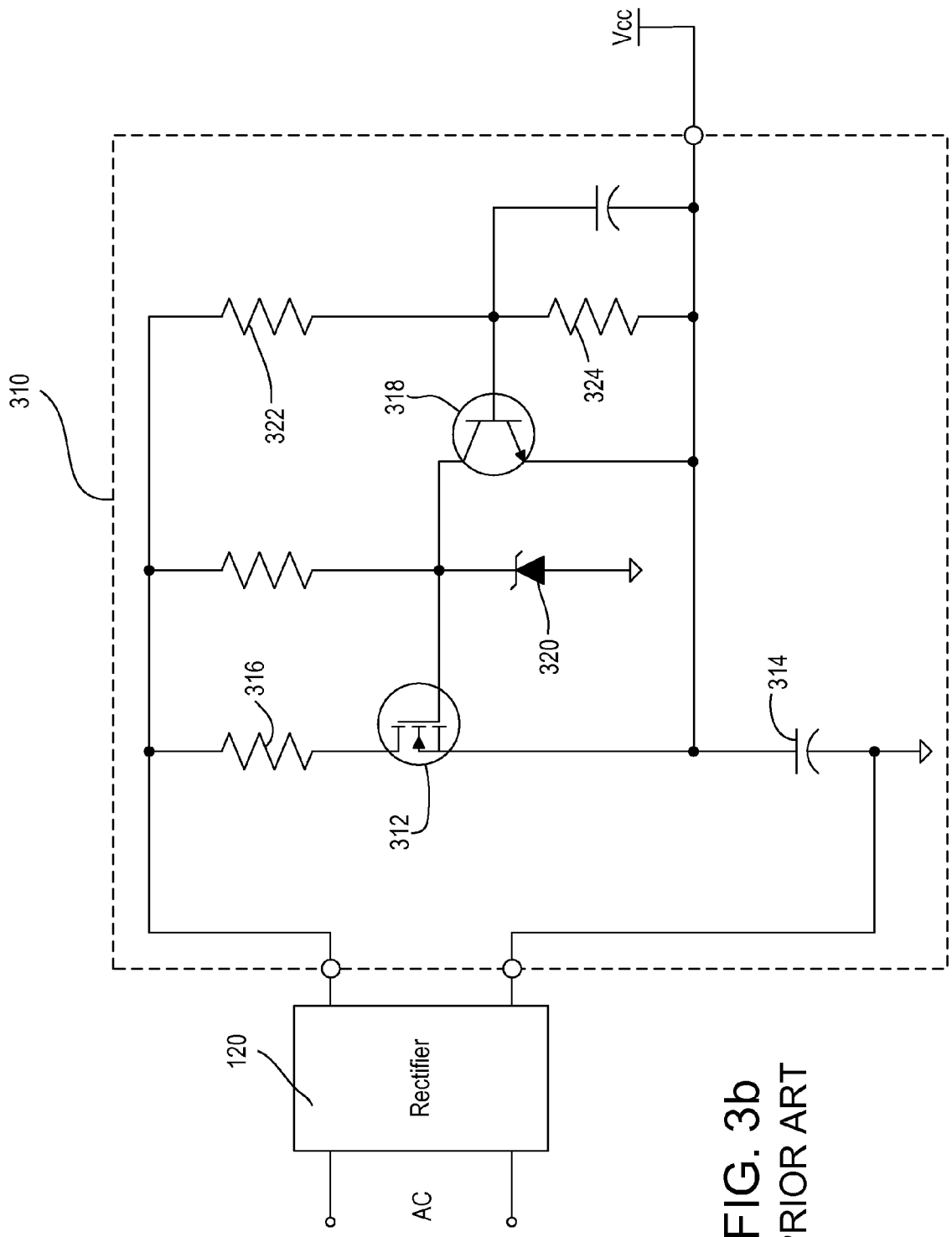
FIG. 3b is a simplified schematic of a prior art cat-ear power supply that may be used with the ballast of FIG. 1.
Figure 3C:
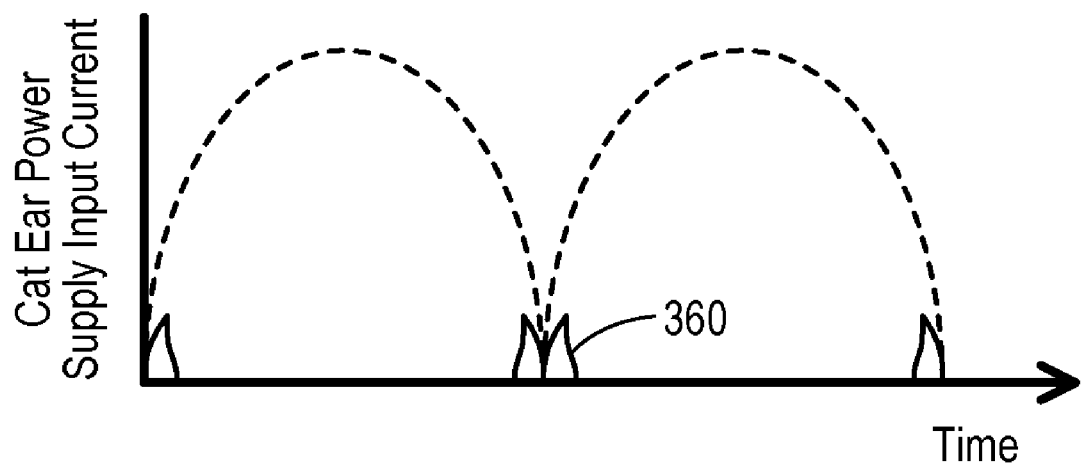
FIG. 3c is a simplified waveform diagram illustrating the input current of the prior art cat-ear power supply of FIG. 3b.
Figure 3D:
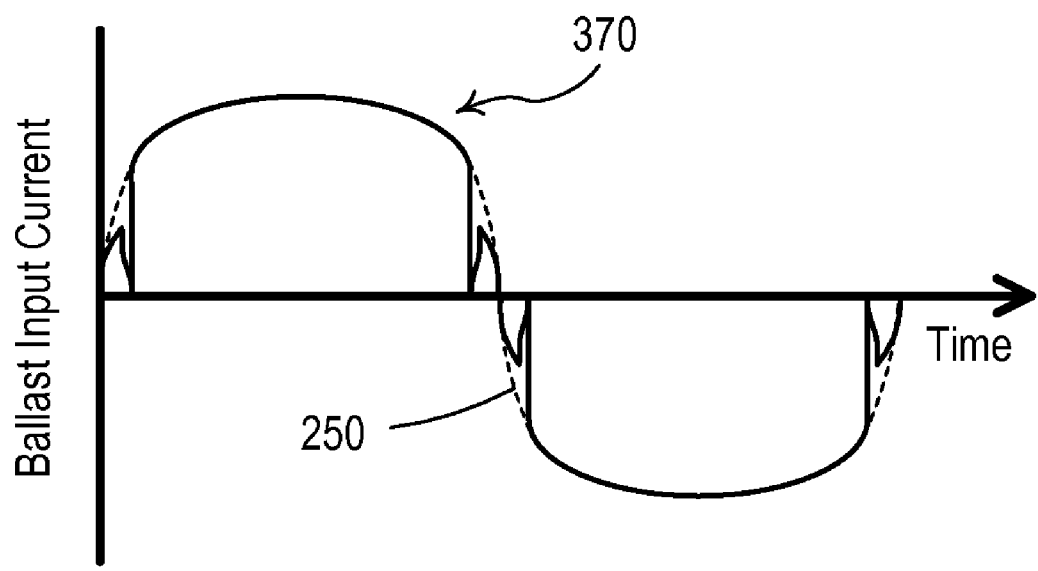
FIG. 3d is a simplified waveform diagram illustrating the input current of the ballast of FIG. 1 including the cat-ear power supply of FIG. 3b.

The difference between the power into the power supply and the total power consumed (i.e., the excess power) is 2.5 watts, which is provided through the first output 412 to the inverter 160. Prior art cat-ear power supplies, such as power supply 310 shown in FIG. 3b, did not provide a path to supply power to the inverter 160, so the excess power was dissipated in the large resistor 316. Considering the example from above, the resistor would be required to dissipate 2.5 watts.

The power that is consumed by the ballast control circuit 490, and any external sensors, is not constant. Even though the average power consumption of these components may be determinable, the instantaneous power may vary greatly, which can also produce variations in the input current of the flyback cat-ear power supply 410. However, the flyback cat-ear power supply of the present invention is capable of supplying to the inverter 160 any excess power that is not consumed by the ballast control circuit 490 and any external sensors. Considering the example from the previous paragraph, if the power consumption of the ballast control circuit 490 drops to zero, then three watts of excess power will be supplied to the inverter 160. Note that when driving a lamp at any intensity, the back end of the ballast will always consume at least the excess amount of power that is drawn by the flyback cat-ear power supply 410.

Thus, no excess power is lost in the flyback cat-ear power supply 410 of the present invention, but instead the excess power is provided to the inverter 160 to drive the lamp. Thus, the flyback cat-ear power supply 410 is more efficient, and is operable to draw current until the moment that the inverter 160 begins drawing current from the AC power supply, independent of the power consumption of the ballast control circuit 490 or any external sensors. The result is an input current to the ballast that is more continuous, resulting in a lower THD.

As mentioned above, to minimize the THD of the ballast, the input current must be as sinusoidal as possible (i.e. ideally, the shape of the input current follows the shape of the AC mains line voltage). Therefore, the ballast should ideally appear to the AC power supply as a resistive load having a constant resistance. Certain parameters of the flyback cat-ear power supply 410 can be set such that the ballast appears as a substantially resistive load to the AC power supply when the cat-ear power supply is drawing current. The value of the inductance of the primary side 412 of transformer 410 and the values of the frequency and the duty cycle of the square wave driving FET 520, determine the shape and peak value of the current drawn by the flyback cat-ear power supply 410.

The impedance, $R_{IN}$, looking into the ballast when the flyback cat-ear power supply 410 is drawing current is essentially the value of the AC mains line voltage divided by the input current of the ballast or:

$$R_{IN} = v_{AC}/i_{IN}. \quad \text{(Equation 2)}$$

Since the period of the switching of the FET 520 is very small in comparison to the period of the line cycle, the AC mains line voltage $v_{AC}$ is substantially constant throughout the period of the switching cycle of the FET. When the FET 520 is conducting, the voltage $v_L$ across the inductance L of the primary winding 412 is essentially equal to the AC mains line voltage, i.e., $v_L = v_{AC}$. The voltage $v_L$ is equal to the inductance L multiplied by $di_L/dt$, i.e., the change in the current through the primary winding as a function of time, as shown by:

$$v_L = L*(di_L/dt). \quad \text{(Equation 3)}$$

Since the flyback cat-ear power supply is operating in discontinuous mode, the change in current, $di_L$, each period is from zero to a peak value, $I_{L-PK}$, resulting in $di_L = I_{L-PK}$. The change in time, dt, is the duty cycle D of the switching of FET 520 times the period, i.e., dt=D*T. The period T is the inverse of the frequency f, i.e., T=1/f. Thus, equation 3 simplifies to:

$$v_{AC} = L*(f*I_{L-PK}/D). \quad \text{(Equation 4)}$$

Since the EMI filter 115 isolates high-frequency signals from the AC power supply, the input current to the ballast, $i_{IN}$, is equal to the average value of the inductor current, as shown by:

$$i_{IN} = i_{L-AV} = (1/T)\int i_L(t)dt. \quad \text{(Equation 5)}$$

The integral of the current through the primary winding can be easily solved for by noting that the area under the curve of a triangle is simply one half of the base times the height, and thus:

$$i_{IN} = (1/T)*(\tfrac{1}{2})*(D*T)*I_{L-PK} = (\tfrac{1}{2})*D*I_{L-PK}. \quad \text{(Equation 6)}$$

Therefore, substituting $v_{AC}$ from equation 4 and $i_{IN}$ equation 6 into equation 2, the impedance $R_{IN}$ of the ballast can be calculated as:

$$R_{IN} = v_{AC}/i_{IN} = 2*L*f/D^2. \quad \text{(Equation 7)}$$

Since the inductance of the primary winding, the frequency and the duty cycle of the switching of FET 520 are constant, the impedance $R_{IN}$ is also constant. Thus, the flyback cat-ear power supply draws a current that is proportional to the AC mains voltage, and hence follows the shape of the AC mains voltage. The inductance of the primary winding, the frequency and the duty cycle of the switching of FET 520 can be determined such that the input current to the flyback cat-ear power supply is the same value as the input current that the inverter will draw at the moment that the flyback cat-ear power supply stops drawing current and the inverter begins drawing current. Thus, the current drawn from the AC mains can be made more nearly continuous.

Since the flyback cat-ear power supply 410 provides power to the inverter 160 during the time period when the valley-fill capacitors 280, 282 provide power to the inverter, the ballast of the present invention has further advantages over the ballasts of the prior art. First, because less current is drawn from the valley-fill capacitors 280, 282 to drive the inverter 160, the DC bus voltage 220 drops less during the valleys between successive rectified voltage peaks. The valley-fill capacitors 280, 282 can thus have a smaller capacitance, which means that the physical size of the capacitors will also be smaller. Finally, since less energy is needed to recharge the valley-fill capacitors 280, 282, the charging currents of the capacitors when the inverter 160 stops drawing current from the flyback cat-ear power supply 410 and begins drawing current directly from the AC line will be of smaller magnitude. This results in improved ballast input current wave shape during the time when the inverter 160 is drawing current directly from the AC mains.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic ballast for driving a gas discharge lamp, said ballast drawing an input current from an AC power supply, said ballast comprising:
    a rectifier for rectifying an AC input voltage from said AC power supply to produce a rectified voltage;
    a filter circuit for converting said rectified voltage to a filtered bus voltage;
    an inverter for converting said bus voltage to a high-frequency AC drive voltage to drive said lamp;
    an output circuit for filtering said high-frequency AC drive voltage in order to supply an essentially sinusoidal voltage to said lamp;
    a control circuit coupled to said inverter for controlling the operation of said inverter; and
    a ballast power supply coupled to receive said rectified voltage for selectively drawing current from said AC power supply when said rectified voltage is lower than a predetermined value such that said input current to said ballast is essentially sinusoidal, said ballast power supply operable to generate a substantially DC voltage for powering said control circuit;
    wherein said ballast power supply is coupled to said inverter and is operable to provide current to said inverter when the magnitude of said rectified voltage is less than said predetermined value.

2. The electronic ballast according to claim 1, wherein said ballast power supply includes a cat-ear power supply.

3. The electronic ballast according to claim 2,
    wherein said cat-ear power supply includes a first output for supplying current to said inverter and a second output for supplying power to said control circuit.

4. The electronic ballast according to claim , wherein said ballast power supply includes a flyback cat-ear power supply.

5. The electronic ballast according to claim 4, wherein said cat-ear power supply includes a flyback control circuit operable to cause said cat-ear power supply to draw current from said AC power supply when said rectified voltage is lower than said predetermined value.

6. The electronic ballast according to claim 4, wherein said cat-ear power supply includes a flyback control circuit operable to cause said cat-ear power supply to draw current from said AC power supply when said current drawn by said inverter from said AC power supply is substantially zero amps.

7. An electronic ballast for driving a gas discharge lamp, said ballast drawing an input current from an AC power supply, said ballast comprising:
    a rectifier for rectifying said AC input voltage from said AC power supply to produce a rectified voltage;
    an inverter for generating a high-frequency AC drive voltage to drive said lamp;
    a first circuit coupled from said rectifier to said inverter for supplying current to said inverter, said first circuit operable to provide current from said AC power supply to said inverter and to provide said rectified voltage to said inverter when the magnitude of said rectified voltage is greater than a predetermined value; and a second circuit coupled from said rectifier to said inverter in parallel electrical connection with said first circuit for supplying current to said inverter, said second circuit operable to provide current to said inverter and to provide a boosted voltage to said inverter when the magnitude of said rectified voltage is less than said predetermined value;

wherein the magnitude of said boosted voltage is greater than the magnitude of said rectified voltage when the magnitude of said rectified voltage is less than said predetermined value.

8. The electronic ballast according to claim 7, wherein said second circuit comprises a boost converter having an output coupled to said inverter for supplying current to said inverter, and said first circuit comprises a diode.

9. An electronic ballast for driving a gas discharge lamp, said ballast drawing an input current from an AC power supply, said ballast comprising:
a rectifier for rectifying an AC input voltage from said AC power supply to produce a rectified voltage;
a filter circuit for converting said rectified voltage to a filtered bus voltage;
an inverter for converting said bus voltage to a high-frequency AC drive voltage to drive said lamp;
a control circuit coupled to said inverter for controlling the operation of said inverter; and
a flyback cat-ear power supply coupled to receive said rectified voltage for selectively drawing current from said AC power supply when said rectified voltage is lower than a predetermined value such that said input current to said ballast is essentially sinusoidal, said cat-ear power supply operable to generate a substantially DC voltage for powering said control circuit, said flyback cat-ear power supply comprising a flyback control circuit operable to cause said cat-ear power supply to draw current from said AC power supply when said rectified voltage is lower than said predetermined value, a semiconductor switch coupled to conduct current from said AC power supply when said semiconductor switch is conductive, and a transformer having a primary winding and a secondary winding, said primary winding coupled in series electrical connection with said semiconductor switch, said cat-ear power supply coupled to said inverter and operable to provide current to said inverter when the magnitude of said rectified voltage is less than said predetermined value;
wherein said flyback control circuit is operable to receive said rectified voltage and to repeatedly control said semiconductor switch to be conductive and non-conductive at a high frequency to generate a boosted voltage across said secondary winding only when said rectified voltage is below said predetermined value.

10. The electronic ballast according to claim 9, wherein said high frequency and a duty cycle of operation of said semiconductor switch of said ballast power supply are constant.

11. The electronic ballast according to claim 10, wherein an input impedance of said ballast is constant when said cat-ear power supply is generating said boosted voltage when said rectified voltage is below said predetermined value.

12. The electronic ballast according to claim 9, wherein said secondary winding includes a tap for producing a tap voltage less than said boosted voltage for generating said substantially DC voltage.

13. An electronic ballast for driving a gas discharge lamp comprising:
a rectifier for rectifying an AC line voltage to produce a rectified voltage;
a boost converter for receiving said rectified voltage and producing a substantially DC output voltage having an average magnitude that is approximately one-half of a peak value of said rectified voltage; and
an inverter for receiving said DC output voltage and for producing high-frequency AC drive voltage to be supplied to said lamp;
wherein said inverter is operable to convert said output voltage of said boost converter to said high-frequency AC drive voltage when said rectified voltage is less than said predetermined value and to convert said rectified voltage to said high-frequency AC drive voltage when said rectified voltage is more than said predetermined value.

14. The electronic ballast according to claim 13, wherein said boost converter produces said output voltage for only a portion of a half cycle of said AC line voltage.

15. The electronic ballast according to claim 13, wherein said boost converter produces said output voltage when said rectified voltage is less than said predetermined value.

16. The electronic ballast according to claim 15, wherein said inverter is operable to convert said output voltage of said boost converter to said high-frequency AC drive voltage when said output voltage of said boost converter is greater than said rectified voltage and to convert said rectified voltage to said high-frequency AC drive voltage when said rectified voltage is greater than said output voltage of said boost converter.

17. A cat-ear circuit for an electronic ballast having a front end for receiving an AC input voltage and a back end for driving a gas discharge lamp comprising:
an input for receipt of a rectified voltage;
a semiconductor switch coupled in series electrical connection between said input and a circuit common, said semiconductor switch having a conductive state and a non-conductive state;
a transformer having a primary winding and a secondary winding, said primary winding coupled in series electrical connection with said semiconductor switch;
a control circuit operable to receive said rectified voltage and to repeatedly switch said semiconductor switch at a high frequency between said conductive state and said non-conductive state only when said rectified voltage is below a predetermined level, such that a boosted voltage is produced across said secondary winding of said transformer;
a first output for providing said boosted voltage to said ballast back end only when said rectified voltage is below said predetermined level; and
a second output for providing a substantially low-magnitude DC voltage.

* * * * *

UNITED STATES PATENT AND TRADEMARK OFFICE
CERTIFICATE OF CORRECTION

| | | |
|---|---|---|
| PATENT NO. | : 7,825,609 B2 | Page 1 of 1 |
| APPLICATION NO. | : 12/168977 | |
| DATED | : November 2, 2010 | |
| INVENTOR(S) | : Mark S. Taipale et al. | |

It is certified that error appears in the above-identified patent and that said Letters Patent is hereby corrected as shown below:

At column 4, line 64, delete the text "where said primary winding coupled" and replace with the text --where said primary winding is coupled--.

At column 5, line 5, delete "for".

At column 10, line 42, delete "claim" and replace with --claim 1--.

Signed and Sealed this
Twenty-sixth Day of April, 2011

David J. Kappos
*Director of the United States Patent and Trademark Office*